United States Patent [19]

Fong et al.

[11] Patent Number: 5,143,622
[45] Date of Patent: Sep. 1, 1992

[54] PHOSPHINIC ACID-CONTAINING POLYMERS AND THEIR USE IN PREVENTING SCALE AND CORROSION

[75] Inventors: Dodd W. Fong, Naperville; Mary A. Kinsella, Manhattan; James F. Kneller, LaGrange Park; John W. Sparapany, Bolingbrook, all of Ill.

[73] Assignee: Nalco Chemical Company, Naperville, Ill.

[21] Appl. No.: 710,591

[22] Filed: Jun. 5, 1991

[51] Int. Cl.⁵ .............................................. C02F 5/14
[52] U.S. Cl. .................................. 210/700; 252/180; 252/389.22; 422/15; 210/701
[58] Field of Search ................................. 210/698–701; 252/180, 181, 389.22, 389.23; 422/15, 16

[56] References Cited

U.S. PATENT DOCUMENTS

| | | | |
|---|---|---|---|
| 4,088,678 | 5/1978 | Matt et al. | 260/502.4 R |
| 4,590,014 | 5/1986 | Wolf et al. | 210/699 |
| 4,598,092 | 7/1986 | Sasaki et al. | 514/492 |
| 4,604,431 | 8/1986 | Fong et al. | 525/351 |
| 4,678,840 | 7/1987 | Fong et al. | 525/340 |
| 4,681,686 | 7/1987 | Richardson et al. | 210/700 |
| 4,778,655 | 10/1988 | Greaves | 210/698 |
| 4,913,833 | 4/1990 | Lipinski et al. | 252/82 |

*Primary Examiner*—Peter Hruskoci
*Attorney, Agent, or Firm*—Robert A. Miller; John G. Premo

[57] ABSTRACT

The invention describes acrylamide, acrylic acid, polymers and co-polymers containing phosphinate groups to inhibit scale and corrosion caused by metal surfaces contacting industrial waters.

5 Claims, No Drawings

PHOSPHINIC ACID-CONTAINING POLYMERS AND THEIR USE IN PREVENTING SCALE AND CORROSION

INTRODUCTION

The present invention relates to phosphinic acid containing polymers for preventing the formation of scale and corrosion on metal surfaces in contact with corrosive and/or scale forming industrial process waters.

BACKGROUND OF THE INVENTION

The utilization of water which contains certain inorganic impurities, and the production and processing of crude oil water mixtures containing such impurities, is plagued by the precipitation of these impurities with subsequent scale formation. In the case of water which contains these contaminants the harmful effects of scale formation are generally confined to the reduction of the capacity or bore of receptacles and conduits employed to store and convey the contaminated water. In the case of conduits, the impedance of flow is an obvious consequence. However, a number of equally consequential problems are realized in specific utilizations of contaminated water. For example, scale formed upon the surfaces of storage vessels and conveying lines for process water may break loose and these large masses of deposit are entrained in and conveyed by the process water to damage and clog equipment through which the water is passed, e.g., tubes, valves, filters and screens. In addition, these crystalline deposits may appear in, and detract from, the final product which is derived from the process, e.g., paper formed from an aqueous suspension of pulp. Furthermore, when the contaminated water is involved in a heat exchange process, as either the "hot" or "cold" medium, scale will be formed upon the heat exchange surfaces which are contacted by the water. Such scale formation forms an insulating or thermal opacifying barrier which impairs heat transfer efficiency as well as impeding flow through the system.

While calcium sulfate and calcium carbonate are primary contributors to scale formation, other salts of alkaline-earth metals and the aluminum silicates are also offenders, e.g., magnesium carbonate, barium sulfate, the aluminum silicates provided by silts of the bentonitic, illitic, kaolinitic, etc., types.

Many other industrial waters, while not being scale forming, tend to be corrosive. Such waters, when in contact with a variety of metal surfaces such as ferrous metals, aluminum, copper and its alloys, tend to corrode one or more of such metals or alloys. A variety of compounds have been suggested to alleviate these problems. Such materials are low molecular weight polyacrylic acid polymers. Corrosive waters of this type are usually acidic in pH and are commonly found in closed recirculating systems.

Numerous compounds have been added to these industrial waters in an attempt to prevent or reduce scale and corrosion. One such class of materials are the well known organophosphonates which are illustrated by the compounds hydroxyethylidene diphosphonic acid (HEDP) and phosphonobutane tricarboxylic acid (PBTC). Another group of active scale and corrosion inhibitors are the monosodium phosphinicobis (succinic acids) which are described in U.S. Pat. No. 4,088,678.

The present invention relates to preventing scale and corrosion of metal surfaces in contact with scale forming or corrosive industrial process waters with low molecular weight acrylamide polymers, acrylic acid polymers and co-polymers of acrylic acid with acrylamide which have been modified to incorporate within their structure $C_2$-$C_6$ amidoalkylphosphinic acid groups and the alkali metal, ammonia and amine salts thereof.

THE AMINOALKYLPHOSPHINATES USED TO PREPARE THE PHOSPHINATE POLYMERS

As indicated, these compounds contain $C_2$-$C_6$ alkyl groups which may be either straight or branched chain. In a preferred embodiment these compounds contain a hydroxyl group in the alpha position.

Illustrative of such compounds are alpha-hydroxy-beta-aminoethylphosphinic acid, alpha-hydroxy-beta-aminoisopropylphosphinic acid and aminopropylphosphinic acid. Also included are their alkali metal, (e.g., sodium), ammonium and amine salts such as the trimethyl amine salt. They are capable of being used to introduce phosphinic acid and phosphinic acid salt groups into acrylic acid or acrylamide polymers.

The alpha-hydroxy-beta-aminoalkylphosphinic acids are conveniently prepared by the reaction of a haloalkyl-hydroxy-phosphinic acid with ammonia. The starting haloalkyl-hydroxy-phosphinic acids are described along with their method of preparation in the U.S. Pat. No. 4,598,092, the disclosure of which is incorporated herein by reference. This patent teaches that alpha-hydroxy-beta-haloethylphosphinic acid can be produced by reacting a haloacetaldehyde or its dialkyl acetals with aqueous phosphinic acid in the presence of an acid catalyst (e.g, hydrochloric acid, sulfuric acid), usually at a temperature of 10° to 100° C. for 1 to 24 hours. The amount of the phosphinic acid may be 1.0 to 10 equivalents to the haloacetaldehyde or its dialkylacetal. This reaction produces the compound

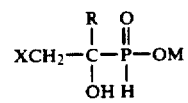

where M is H, alkali metal, ammonia or amine, X is Cl or Br and R is H or a lower alkyl group such as $CH_3$, $C_2H_5$, etc.

These compounds are then reacted with aqueous concentrated solutions of ammonium hydroxide (e.g., about 20%), which are added to a chilled polar solvent solution of alpha-hydroxy -beta-haloalkylphosphinic acids and then heated to about 30°-70° C. for about 2-10 hours. To illustrate this preparation the following is given by example.

EXAMPLE 1

A solution of

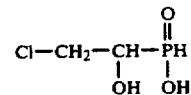

(98.55g theoretical) in water (165 g) was cooled to 0° C. and 30% aqueous ammonia (442 ml) was added dropwise over 20 minutes. The mixture was then heated to 55° C. for five hours.

Using the above described preparative techniques, the following compounds were prepared: alpha-hydroxy -beta-aminoethylphosphinic acid and alpha-hydroxy -beta-aminoisopropylphosphinic acid. Structures of these compounds were confirmed by NMR.

In the case of aminopropylphosphinic acid, this compound is prepared by reacting allylamine with an alkali metal hypophosphite in the presence of a free radical catalyst. The reaction of olefinic groups with alkali metal hypophosphites to produce alkyl phosphinate salts is well known and is described in U.S. Pat. No. 4,590,014, the disclosure of which is incorporated herein by reference. The patent does not disclose the reaction of allylamine with alkali metal hypophosphites to produce aminopropyl(alkali metal)phosphinates. When the acid form of these salts is desired they can be prepared by treatment with dilute mineral acids or by the use of acid form cation exchange resins. The preparation of this compound is show below in Example 2.

EXAMPLE 2

Allylamine (30 g), sodium hypophosphite (50.95 g) and azobisisobutyronitrile (AIBN, 2.16 g) in 50% aqueous methanol (200 ml) were heated to 80° C. with vigorous stirring. Additional AIBN (2.-16 g) was added portion wise over 5 minutes and the reaction was maintained at 80° C. for 6 hours.

THE STARTING ACRYLAMIDE AND ACRYLIC ACID POLYMERS

AND CO-POLYMERS OF ACRYLIC ACID WITH ACRYLAMIDE

Homopolymers of acrylamide, acrylic acid and co-polymers of acrylic acid with acrylamide which are modified with the aminoalkylphosphinates should have a weight average molecular weight within the range of 1,000–100,000, preferably 1,000–40,000, and most preferably 1,000–20,000. They are utilized in the reactions described hereafter in the form of aqueous solutions, typically having concentrations between 5%–40% by weight. When the starting polymers are acrylic acid and acrylamide co-polymers, the mole ratios may vary between 5-95 to 95-5 mole percent. Typically, however, these co-polymers will contain between 5-50 mole percent of acrylamide. The polymers may contain up to 15 mole percent of diluent monomers such as acrylonitrile, vinyl acetate, vinyl chloride and styrene.

MODIFICATION OF THE POLYMERS WITH THE

AMINO($C_2$-$C_6$)ALKYL PHOSPHINIC ACID COMPOUNDS

The reaction of the aminoalkylphosphinic acids, or their salts, converts the carboxylic acid groups of the acrylic acid polymer into the corresponding amido groups by means of a simple amidation reaction. When the polymers contain acrylamide groups, the aminoalkylphosphinic acids or their salts undergo a transamidation reaction whereby the amine is substituted for the amide nitrogen in the acrylamide polymer.

The amount of substitution of the amino groups may be as little as 1 mole percent up to about as much as 30 mole percent; typically the substitution will be between 3-20 mole percent. The reaction using the conditions described hereafter results in about a 50% conversion based on the aminoalkylphosphinic acids charged to the homopolymers of acrylamide, acrylic acid or co-polymers of acrylic acid with acrylamide.

The reaction conditions used to either amidate the carboxylic acid or transamidate the amide groups are described in U.S. Pat. No. 4,678,840. This patent is primarily directed to transamidation reactions of aminoalkylphosphonates with acrylamide polymeric moieties contained in acrylic acid co-polymers. U.S. Pat. No. 4,604,431 discloses reaction conditions for converting acrylic acid groups into amide groups by reacting them with aminosulfonic acid groups. The reaction conditions described in this patent are used to convert a portion of the acrylic acid in the homo- or co-polymers of acrylic acid into aminodoalkylphosphonic acid groups or their salts. These patents are incorporated herein by reference.

In conducting the reactions described above, it is beneficial that the pH of the system be within the range of 3 to 11. A pH of 4 to 7 is preferred. Typical reaction temperatures and times are illustrated hereafter in Table 1.

A preferred method for introducing amidopropylphosphinic groups into the acrylic acid polymers or co-polymers thereof with acrylamide is to react these polymers with allylamine to produce the corresponding allylamides. These polymers containing the allylamide groups are then reacted with alkali metal hypophosphites in accordance with U.S. Pat. No. 4,590,014.

The preparation of the phosphinate modified polymers is illustrated in Table 1.

EXAMPLE 1

In Table 1 PAA and AA are polyacrylic acid and acrylic acid, respectively, AAm is acrylamide, MAA is methacrylic acid and VAc is vinyl acetate.

TABLE 1

GENERAL PROCEDURE FOR MODIFICATION:
A mixture of the amine and the polymer solution were sealed in a reaction vessel capable of withstanding a pressurized chemical reaction and then heated to the specified temperature for the specified reaction time.

| SAMPLE | POLYMER COMPOSITION | MOL. Wt. | AMINOALKYL PHOSPHINIC ACID | MOL % CHARGE AMINE | RXN. TEMP. | RXN. TIME | RXN. pH |
|---|---|---|---|---|---|---|---|
| A | PAA | 4500 | $H_2NCH_2CH(OH)(PO_2H_2)$ | 5 | 150° C. | 5 HRS. | 9.0 |
| B | PAA | 4500 | $H_2NCH_2CH(OH)(PO_2H_2)$ | 15 | 150° C. | 5 HRS. | 6.3 |
| C | 50/50 AA/AAm | 6450 | $H_2NCH_2CH(OH)(PO_2H_2)$ | 10 | 150° C. | 5 HRS. | 6.5 |
| D | 50/30/20 AA/AAm/MAA | 11,200 | $H_2NCH_2CH(OH)(PO_2H_2)$ | 10 | 150° C. | 5 HRS. | 4.0 |
| E | 45/50/5 AA/AAm/VAc | 7050 | $H_2NCH_2CH(OH)(PO_2H_2)$ | 10 | 150° C. | 5 HRS. | 3.7 |
| F | PAA | 5400 | $H_2NCH_2C(CH_3)(OH)PO_2H_2$ | 10 | 140° C. | 8 HRS. | 3.7 |
| G | 50/50 AA/AAm | 2500 | $H_2NCH_2C(CH_3)(OH)PO_2H_2$ | 25 | 140° C. | 8 HRS. | 4.8 |
| H | PAA | 5400 | $H_2NCH_2CH=CH_2$ | 10 | 140° C. | 12 HRS. | 3.8 |

TABLE 1-continued

GENERAL PROCEDURE FOR MODIFICATION:
A mixture of the amine and the polymer solution were sealed in a reaction vessel capable of withstanding a pressurized chemical reaction and then heated to the specified temperature for the specified reaction time.

| SAMPLE | POLYMER COMPOSITION | MOL. Wt. | AMINOALKYL PHOSPHINIC ACID | MOL % CHARGE AMINE | RXN. TEMP. | RXN. TIME | RXN. pH |
|---|---|---|---|---|---|---|---|
| I | 50/50 AA/AAm | 2500 | $H_2NCH_2CH=CH_2$ | 25 | 140° C. | 12 HRS | 4.9 |
| J | AAm | — | $NH_2CH_2CH_2CH_2(PO_2H_2)$ | 10 | 140° C. | 6 HRS | 5.4 |

USE OF THE AMIDOALKYLPHOSPHINATE POLYMERS TO INHIBIT SCALE AND CORROSION

EXAMPLE 2

When modified polymers of the type shown above are used as scale and corrosion inhibitors, the dosage on an active polymer basis may be within the range of one part per million up to as much as several hundred parts per million by weight of polymer. A typical dosage range would be 3–50 ppm. Optimum dosages can be determined by routine experimentation.

Backbone Polymers

| SAMPLE NUMBER | POLYMER COMPOSITION | MW | % POLYMER |
|---|---|---|---|
| 001 | 100% AA | 4500 | 32.5 |
| 008 | 100% AA | 5400 | 35 |
| 009 | 50/50 AA/AAm | 2500 | 35 |

POLYMERS MODIFIED WITH ALPHA-HYDROXY-BETA-AMINOETHYLPHOSPHINIC-ACID

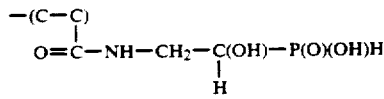

| SAMPLE NUMBER | BACKBONE POLYMER | PHOSPHINATE CHARGE (MOLE %) | % POLY | REACTION pH |
|---|---|---|---|---|
| 85 | 001 | 5 | 28.1 | 9.0 |
| 84 | 001 | 10 | 24.9 | 9.8 |
| 93 | 001 | 15 | 22.4 | 10.0 |
| 95 | 001 | 15 | 18.6 | 6.3 |

| SAMPLE NUMBER | BACKBONE POLYMER | PHOSPHINATE CHARGE (MOLE %) | % POLYMER |
|---|---|---|---|
| 027 | 008 | 10 | 33.7 |
| 031-A | | (OXIDIZED 027) | 32.3 |
| 031-B | 008 | 25 | 33.0 |
| 033 | | (OXIDIZED 031-B) | 30.4 |
| 028 | 009 | 10 | 34.1 |
| 032-A | | (OXIDIZED 028) | 32.7 |
| 032-B | 009 | 25 | 33.1 |
| 034 | | (OXIDIZED 032-B) | 30.5 |

POLYMERS MODIFIED WITH ALPHA-HYDROXY-BETA-AMINOISOPROPYLPHOSPHINIC-ACID

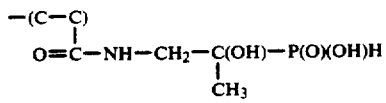

| SAMPLE NUMBER | BACKBONE POLYMER | PHOSPHINATE CHARGE (MOLE %) | % POLYMER |
|---|---|---|---|
| 039 | 008 | 10 | 33.9 |
| 035 | | (OXIDIZED 039) | 32.6 |
| 045 | 008 | 25 | 33.4 |
| 036 | | (OXIDIZED 045) | 30.8 |
| 040 | 009 | 10 | 34.3 |
| 037 | | (OXIDIZED 040) | 32.9 |
| 046 | 009 | 25 | 33.5 |

Backbone Polymers

| | | |
|---|---|---|
| 038 | (OXIDIZED 046) | 30.9 |

POLYMERS MODIFIED WITH ALLYL AMINE, THEN $NaH_2PO_2$, AIBN

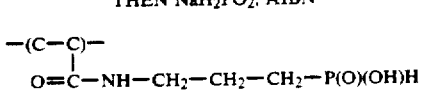

| SAMPLE NUMBER | BACKBONE POLYMER | AMINE CHARGE (MOLE %) | % POLYMER |
|---|---|---|---|
| 014 | 008 | 10 | 21.9 |
| 027 | | (OXIDIZED 014) | 21.3 |
| 025 | 008 | 25 | 21.7 |
| 029 | | (OXIDIZED 025) | 20.3 |
| 015 | 009 | 10 | 21.9 |
| 028 | | (OXIDIZED 015) | 21.3 |
| 026 | 009 | 25 | 21.6 |
| 030 | | (OXIDIZED 026) | 20.2 |

EXAMPLE 3

TABLE 2

Benchtop Screening Test for Calcium Carbonate Scale Inhibition of Several Aminoalkylphosphinic Acid-Modified Polymers Water Chemistry/Conditions:
360 ppm Ca/200 ppm Mg/500 ppm $HCO_3$ (as $CaCO_3$)
Temperature: 60° C., Stir rate: 300 rpm
Titrant: 0.10 Normal NaOH
Dosage: 5, 10 and 15 ppm actives
Standard Deviation of Saturation Ratio: +/−6.6
Saturation ratio of blank: 3.0

| SAMPLE NUMBER | Saturation Ratio POLYMER DOSAGE | | |
|---|---|---|---|
| | 5 ppm | 10 ppm | 15 ppm |
| alpha-hydroxy-beta-aminoethylphosphinic acid-modified polymers: | | | |
| 84 | 74.8 | 107.5 | 130.7 |
| 85 | 80.0 | 107.5 | 122.9 |
| 93 | 56.6 | 113.7 | 114.9 |
| 95 | 56.6 | 85.4 | 119.9 |
| Backbone Polymer | 88.8 | 119.9 | 131.9 |
| 027 | 95.6 | 121.8 | 142.6 |
| 031-B | 93.9 | 121.8 | 130.9 |
| 028 | 53.7 | 46.4 | 99.5 |
| 032-B | 53.9 | 39.8 | 34.0 |
| alpha-hydroxy-beta-aminoisopropylphosphinic acid modified polymers: | | | |
| 039 | 76.8 | 112.3 | 130.9 |
| 045 | 62.3 | 109.2 | 130.9 |
| 040 | 46.4 | 53.9 | 93.9 |
| 046 | 43.0 | 31.4 | 50.0 |
| Polymers modified with allylamine, then $NaH_2PO_2$: | | | |
| 014 | 82.3 | 118.6 | 142.6 |
| 025 | 39.8 | 53.9 | 24.6 |
| 015 | 39.8 | 36.8 | 36.8 |
| 026 | 17.5 | 22.5 | 19.1 |

EXAMPLE 4

TABLE 3

Benchtop Screening Test for Calcium Carbonate
Scale Inhibition of Several Aminoalkylphosphinic
Acid Modified Polymers
Stir and Settle Test Water Chemistry/Conditions:
360 ppm Ca/200 ppm Mg/500 ppm $HCO_3$ (as $CaCO_3$)
Temperature: 60° C., Stir rate: 250 rpm
Titrant: 0.10 Normal NaOH, pH: 9.0 for two hours
Blank: 0.6% inhibition, 1.3% dispersancy

| Inhibitor | | 5 ppm | 10 ppm | 15 ppm |
|---|---|---|---|---|
| alpha-hydroxy-beta-aminoethylphosphinic acid modified polymer: | | | | |
| 84: | % inhibition: | 33.5% | 49.5% | 52.9% |
|  | % dispersancy: | 33.5% | 47.6% | 56.1% |
| 031-B: | % inhibition: | 46.4% | 51.2% | 62.0% |
|  | % dispersancy: | 39.3% | 46.5% | 74.0% |

EXAMPLE 5

Electrochemical Screening Test for Mild Steel
Corrosion Inhibition of Several Aminoalkylphosphinic
Acid Modified Polymers Water Chemistry/Conditions:
360 Ca / 200 ppm Mg / 440 $HCO_3$ (as $CaCO_3$)
Temperature: 120° F., pH : uncontrolled, air agitation,
Unpolished Mild Steel specimen, 30 minute delay time,
500 rmp
Standard Deviation of corrosion rate: $+/-0.345$ mpy

TABLE 4

Inhibitor combination:
(A). 20 ppm inhibitor, 0 ppm PBTC, 15 ppm sulfonated acrylate polymer
(B). 10 ppm inhibitor, 10 ppm PBTC, 15 ppm sulfonated acrylate polymer
(C). 10 ppm inhibitor, 10 ppm PBTC, 15 ppm substituted acrylamide, (PBTC - phosphonobutanetricarboxylic acid)

| Inhibitor | Corrosion Rate (mpy) | | |
|---|---|---|---|
|  | (A) | (B) | (C) |
| Blank | 8.63 | .975 | 1.92 |
| alpha-hydroxy-beta-aminoethylphosphinic acid-modified polymers: | | | |
| 84 | 1.49 | .793 (1.14) | 2.37 |
| 85 | 3.96 | 1.40 | xxxx |
| 027 | xxxx | .961 | xxxx |
| 028 | xxxx | 1.29 | xxxx |
| alpha-hydroxy-beta-aminoisopropylphosphinic acid modified polymers: | | | |
| 039 | xxxx | .715 | xxxx |
| 040 | xxxx | 1.65 | xxxx |

EXAMPLE 6

| Polymer modified with allyl amine, then $NaH_2PO_2$, AIBN per Example 2: | | | |
|---|---|---|---|
| 014 | xxxx | .887 | xxxx |

The test methods used to generate the above data are set forth below.

Saturation Ratio Test

A test solution was prepared by adding calcium, magnesium, inhibitor and bicarbonate to deionized water. Initial concentrations of the salts should be: 360 ppm $Ca^{+2}$, 200 ppm $Mg^{+2}$, 500 ppm $HCO_3-$(as $CaCO_3$) and 5, 10, or 15 ppm of inhibitor as actives/solids. The temperature was maintained at 140° F. (60° C.), the solution was stirred at all times, and the pH was continuously monitored. The solution was titrated with dilute NaOH at a constant rate. With the addition of NaOH, the pH of the test solution slowly increased, then decreased slightly, and increased again. The maximum pH prior to the slight decrease at supersaturation was the breakpoint pH. A mineral solubility computer program was then used to calculate the calcium carbonate supersaturation ration based on test conditions at the breakpoint pH. This supersaturation ratio is related to the calcium carbonate inhibition performance. The test procedure was repeated for different inhibitor solutions and dosages. All precipitated calcium carbonate must be removed from the test apparatus with dilute HCl prior to the next test run.

Benchtop Calcium Carbonate Inhibition Test

Calcium, magnesium, inhibitor and bicarbonate were added to deionized water to prepare a test solution with 360 ppm $Ca+^2$, 200 ppm $Mg+^2$, 500 ppm $HCO_3-$ (as $CaCO_3$) and 5, 10 or 15 ppm inhibitor as actives/solids. An initial sample of the test water was collected for calcium analysis by atomic absorption. The test temperature was maintained at 140° F. (60° C.). Using dilute NaOH, the pH of the solution was slowly increased to 9.0, and maintained during the two hour duration of the test. At the conclusion of the test, a small sample of the solution was filtered (0.45 um) and the calcium concentration was determined by atomic absorption. The remainder of the unfiltered sample was allowed to settle, undisturbed for 24 hours, at room temperature. Water was then collected from the top of the flask after 24 hours and analyzed for calcium. The % inhibition and % discrepancy are calculated in the following manner:

$$\% \text{ inhibition} = \frac{\text{ppm Ca}^{+2} \text{ filtered}}{\text{ppm Ca}^{+2} \text{ initial}} \times 100$$

$$\% \text{ dispersancy} = \frac{\text{ppm Ca}^{+2} \text{ unfiltered, settled}}{\text{ppm Ca}^{+2} \text{ initial}} \times 100$$

Electrochemical Test

Both the Tafel plots and linear polarization existence tests were conducted by the same water chemistry and conditions. The test solution for the electrochemical corrosion cell was prepared by adding calcium, magnesium, various inhibitors and bicarbonate to deionized water to obtain 360 ppm $Ca+^2$, 200 ppm $Mg.+^2$, 400 ppm $HCO_3-$(as $CaCO_3$). Temperature was maintained at 120° F. and the solution was aerated throughout the test period. pH was uncontrolled. A standard three electrode cell was assembled for the polarization studies. Pre-polished mild steel specimens were used as the rotating working electrode, at a speed of 500 rpm. All potential measurements were made against a saturated calomel reference electrode. Two graphite rods were used as the counter electrode. Polarization resistance measurements were conducted within $+/-20$ mV of the corrosion potential at a scan rate of 0.1 mV/sec. Tafel plots were performed by polarizing the mild steel specimen at 250 mV cathodically and anodically from the corrosion potential.

We claim:

1. A method of inhibiting scale and corrosion of metal surfaces in contact with scale forming and/or corrosive industrial process waters which comprises treating such waters with at least one part per million of an acrylamide homopolymer and acrylic acid homopolymer or co-polymer of acrylic acid with acrylamide having a molecular weight within the range of 1,000–50,000 which have been modified to contain from 1 to 30 mole percent of amido($C_2$–$C_6$ alkyl)phosphinic acid groups and the alkali metal, ammonium and amine salts thereof.

2. The method of inhibiting scale and corrosion of metal surfaces in contact with scale forming and corrosive industrial process waters of claim 1 where the amido ($C_2$–$C_6$ alkyl) phosphinic acid groups are from the group consisting of alpha-hydroxy-beta-amidoethylphosphinic acid, alpha-hydroxy-beta-amidoisopropylphosphinic acid and amidopropylphosphinic acid.

3. The method of claim 2 where the amido ($C_2$–$C_6$ alkyl) phosphinic acid group is alpha-hydroxy-beta-amidoethylphosphinic acid.

4. The method of claim 2 where the amido ($C_2$–$C_6$ alkyl) phosphinic acid group is alpha-hydroxy-beta-amidoisopropylphosphinic acid.

5. The method of claim 2 where the amido ($C_2$–$C_6$ alkyl) phosphinic acid group is amidopropylphosphinic acid.

* * * * *

UNITED STATES PATENT AND TRADEMARK OFFICE
Certificate

Patent No. 5,143,622                                    Patented: September 1, 1992

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dodd W. Fong, Naperville; Mary A. Kinsella, Manhattan; James F. Kneller, LaGrange Park; John W. Sparapany, Bolingbrock; and Binaifer S. Bedford, Naperville; all of Ill.

Signed and Sealed this Thirteenth Day of July, 1999.

JAY H. WOO
*Supervisory Patent Examiner*
Art Unit 1724